United States Patent [19]

Stacks

[11] Patent Number: 4,681,164
[45] Date of Patent: Jul. 21, 1987

[54] METHOD OF TREATING WELLS WITH AQUEOUS FOAM

[76] Inventor: Ronald R. Stacks, 4200 Crestgate, Midland, Tex. 79707

[21] Appl. No.: 869,018

[22] Filed: May 30, 1986

[51] Int. Cl.⁴ .................... E21B 37/08; E21B 43/25; E21B 43/27
[52] U.S. Cl. ................................. 166/304; 166/307; 166/309; 166/312; 252/8.552
[58] Field of Search ............... 166/304, 309, 307, 312; 252/8.55 B, 8.552

[56] References Cited

U.S. PATENT DOCUMENTS

| | | | |
|---|---|---|---|
| 2,787,326 | 4/1957 | Hughes | 166/312 X |
| 2,978,026 | 4/1961 | Bemis | 166/312 |
| 3,241,614 | 3/1966 | Bertness | 166/304 |
| 3,402,770 | 9/1968 | Messenger | 166/312 X |
| 3,486,560 | 12/1969 | Hutchison et al. | 166/312 X |
| 3,572,440 | 3/1971 | Hutchison et al. | 166/309 X |
| 3,583,483 | 6/1971 | Foote | 166/312 X |
| 3,651,868 | 3/1972 | Caudle et al. | 166/312 X |
| 3,756,319 | 9/1973 | Holm et al. | 166/304 |
| 3,970,148 | 7/1976 | Jones et al. | 166/304 X |
| 4,108,246 | 8/1978 | Jones | 166/312 |

Primary Examiner—George A. Suchfield
Attorney, Agent, or Firm—Keaty & Keaty

[57] ABSTRACT

A method of treating wells with the use of a foam as a circulating fluid provides for the steps of generating a stable foam, circulating the foam up the well to remove loose solids and fluids from the well, injecting solvents to dissolve liquid and solid hydrocarbons, circulating a mixture of foam and mineral acid to remove ferrous salts and calcium carbonate from the well, circulating a calcium sulfate converter to remove calcium sulfate, cleaning up any residue by circulating the foam up the well. The method also provides for the use of iron chelator and corrosion inhibitor. The method has applications in stimulation of the well production, when such production becomes adversely affected by a build-up of solids, during stimulation of water injection, stimulation of a source well, treatment of a disposal well, as well as treatment of a gas producing well.

8 Claims, 1 Drawing Figure

METHOD OF TREATING WELLS WITH AQUEOUS FOAM

BACKGROUND OF THE INVENTION

1. Field of the Invention

This invention relates to treatment of wells utilizing aqueous foam circulation, and particularly for the use of the foam for well stimulation, cleaning, and the like.

In one of the aspects of the invention, it relates to improving the recovery of hydrocarbons from a hydrocarbon-bearing formation utilizing foam injected and circulated in the well.

2. General Discussion of the Background

In the oil producing industry, a problem is often encountered when undesirable material enters the level of production, or formation level, and accumulates as deposit at this level inhibiting an oil flow into the well. The result is a loss of production and temporary interruption of the well operation until such time as the foreign material is removed from the well and the production of hydrocarbons can be resumed.

Various methods are used in the field to improve recovery of hydrocarbons from a hydrocarbon-bearing formation, and to clean out the well. One of the methods involves the use of aqueous foam as a circulation fluid, with an acid component to facilitate stimulation of the producing zone of the well as by cleaning the well. Such method is disclosed in U.S. Pat. No. 3,572,440. Other methods involve the use of water as circulation fluid, although certain disadvantages have been experienced in the field through the use of water as the cleaning media for removing undesirable materials from the well, one of the disadvantages being creation of corrosive environment for the equipment utilized in the well.

Therefore, it was found that the methods teaching the use of foam as circulating fluid have advantages over the methods of using water as a circulating fluid.

It is a known technique in the oil field industry to wash or flush clogged wells with aqueous solutions of strong mineral acid, for example, hydrochloric acid in order to dissolve acid soluble materials in the deposits and facilitate cleaning of the well. Such solution, however, can adversely affect metal equipment in the well corroding it and thereby creating a certain disadvantage for the use of this method.

It is also a well known problem in the art of oil and gas industries that formations at the production zone allow migration of sand, scale and other solids into the well bore causing deterioration of the formation, clogging the flow passages in the hydrocarbon production pipes and erroding the pipes.

SUMMARY OF THE INVENTION

The present invention provides a method of treating wells with the use of foam as a circulating fluid. The use of foam as a carrier fluid has been proven safe for production pipes and for the formation itself. The present method includes the steps of generating a stable foam, circulating the foam up a well, injecting a number of solvents in a well and circulating them up the well, circulating a mixture of foam and a mineral acid to remove ferrous salts and calcium carbonate from the well, as well as circulating a calcium sulfate converter up the well to remove calcium sulfate from the well, and especially from the production zone. The method also provides for the use of an iron chelator injected into the well and subsequently removed by the flow of circulated foam.

The present invention has applications in stimulation of a well production, when such production becomes adversely affected by a build up of solids, such as sand, drill cuttings, iron sulfate and the like in a well at the producing zone. The present invention also can be utilized in a stimulation of water injection, stimulation of a source well, treatment of a disposal well in the oil industry, as well as treatment of a gas producing well.

BRIEF DESCRIPTION OF THE DRAWINGS

The objects and features of the present invention will be more apparent to those skilled in the art from the appended drawings and description of the preferred embodiment wherein.

DETAILED DESCRIPTION OF THE PREFERRED EMBODIMENT

Figure 1:
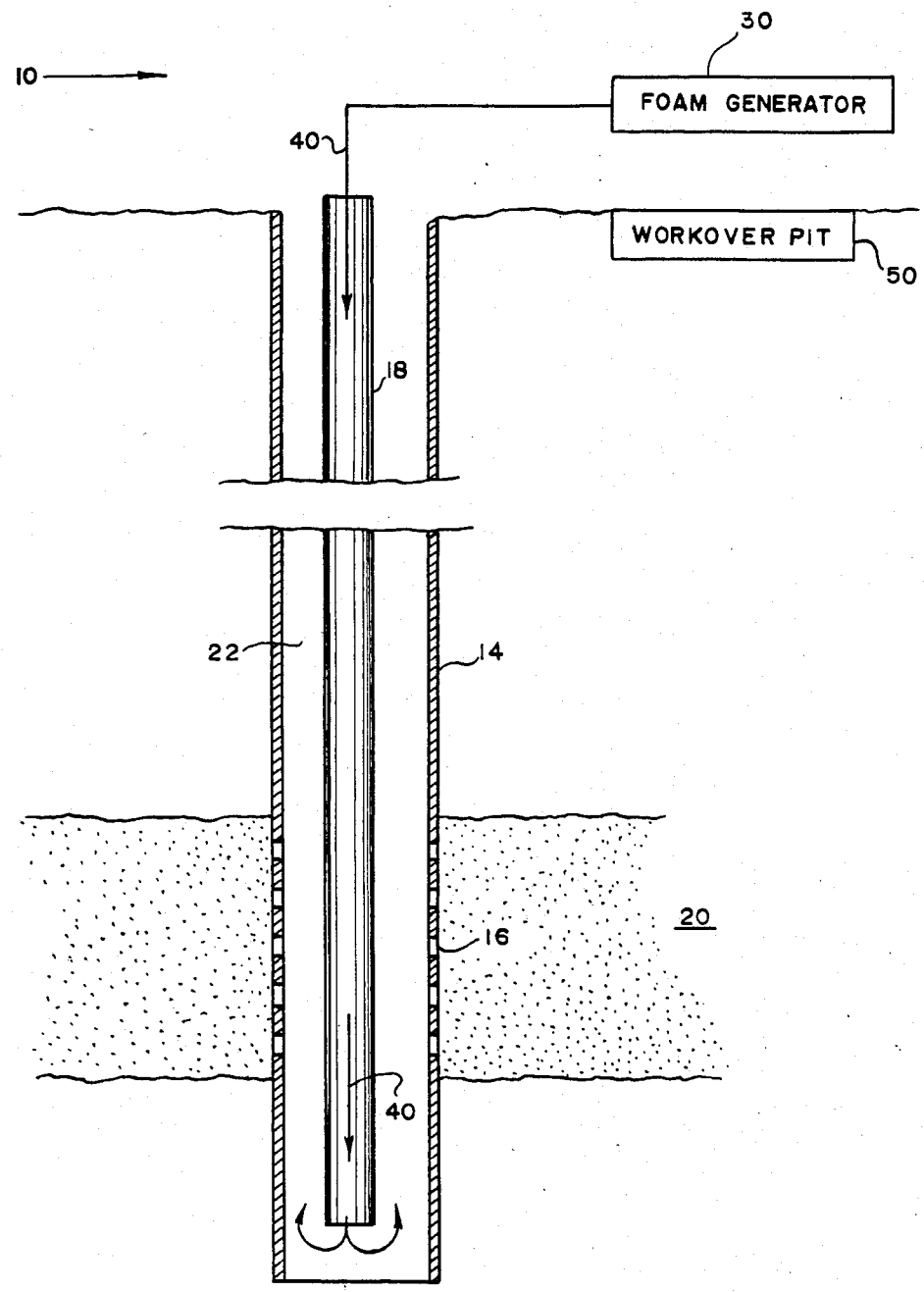
FIG. 1 is a sectional view of a well having a producing/formation zone as a part thereof.

Referring now to FIG. 1, a well 10 is shown having a production zone 20 at its lower portion. The well is cased over by a casing 14, and a liner 16 is coaxially attached to the casing 14 for positioning at the production zone 20. The liner 16 has a suitable perforations to allow hydrcarbons to enter the well and be retrieved out of the well through a production tubing 18 which extends from the surface down into the well 10 and terminates adjacent the producing zone 20.

As can be seen in FIG. 1, an annulus 22 is formed between the walls of the casing and liner 16 and the production tubing 18. Well fluids are produced at the production zone 20 and enter annulus 22, from which they are delivered to the surface by a natural flow or by pumping through the production tubing 18.

Sand particles and other debris inhibit the flow of production fluidly collecting on the face of the liner 16, gradually reducing the fluid production rate or even halting production altogether.

In accordance with the method of the present invention, a foam generating apparatus is used at the production site. A foam generating apparatus is schematically designated by numeral 30 and is used to generate a stable formed foam suitable for use in well operations. In a preferred embodiment of the present invention, a foamable solution is prepared, which comprises 1% of (surfactant), $\frac{1}{2}\%-2\%$ of solvent, 0.25%–5% of corrosion inhibitor and 92%–98.25% of water.

The solution is formed by ordinary means, such as by passing air and the above solution through a foaming unit similar to the one disclosed in U.S. Pat. No. 3,593,800 issued on July 20, 1971, the disclosure of which is incorporated herewith by reference. The so created foam is introduced into the well through the production tubing 18 and is allowed to flow down in the direction of arrows 40, and, when reaching the lowermost part of the tubing 18, to flow into the annulus 22. The foam is introduced in a continuous flow, and the pressure within the well is carefully calculated by suitable control means positioned on the surface. The flow, after entering the annulus 22 flows upward, circulating towards the surface and carrying various loose debris, such as sand, drill cuttings and the like from the surface of the tubing 18 and the well liner 16 upwardly for disposal in the workover pit schematically designated by numeral 50 in FIG. 1. This foam circulation continues at a rate of 1 ft./sec.–100 ft./sec. depending on the resistance created down the well by the debris accumulated at the formation level. An operator carefully monitors the rate of foam flow and the step of removing the debris continuous until clean foam appears on the surface.

The next step in the method of the present invention involves removal of paraffin and oil from the production level. The step is accomplished by introduction of a mutual solvent into the production tubing 18 in order to dissolve oil and paraffin in the producing zone. The solvent is allowed to remain in the well for about 4-10 hours and until substantially all deposited hydrocarbons are removed from solids. After that, a new flow of foam is introduced into the well to bring up to the surface oil and wax dissolved by the mutual solvent.

The next step in the method of the present invention involves removal of iron sulfate, iron oxide and calcium carbonate from the formation zone. The method provides for the use of a mixture of foam and mineral acid to achieve this purpose. A mixture is formed by 1.5-3% of foaming agent, 5-30% of mineral acid, for example, hydrochloric acid, and 67%-93.5% of water. The mixture is circulated up the well, first through the production tubing 18, then through the annulus 22 and is disposed in the workover pit 50 in the usual manner. The exact percentage of the mineral acid will depend on the condition of the formation and is designed to clear the entire open formation face or the perforations in the liner 16.

The well can then be cleaned by a foaming solution used in the initial step (when removing loose solids), with the addition of 1-5% of iron chelator.

In order to completely clean the well, it is essential to remove calcium sulfate from the formation zone and the next step provides for the loading of calcium sulfate converter, such as potassium hydroxide and acidic acid in the sufficient quantitites to cover the production level at formation face and perforations in the casing liner 16. This calcium sulfate converter is allowed to remain in the well for a period of 12-36 hours depending on the conditions of the well and the accumulation of calcium sulfate at the formation level. During this time, calcium sulfate expands and converts from crystals to soft texture particles. At the expiration of the period when calcium sulfate was allowed to convert, a foam flow with an addition of iron chelator, such as for example citric acid or acidic acid is introduced into the well and circulated up the well to remove the converted calcium sulfate from the formation zone for subsequent disposal in the workover pit 50. The preferable mixture for removing the converted calcium sulfate will contain 0.5%-2% of solvent, 0.25%-2% of corrosion inhibitor and 96%-99.25% of water.

It should be noted that after this procedure, the well bore is substantially free of debris and solids build-up at the formation face adjacent the liner 16 and the tubing 18. Nevertheless, it is sometimes advisable to strengthen the formation at the producing zone, further stimulating production of hydrocarbons from this particular well. This goal is achieved by introduction of another solution of a mineral acid and circulating it up the well. Such solution is prepared by a mixture of 5%-30% of acid, such as hydrochloric acid, 0.25%-2% of corrosion inhibitor and 2%-10% of iron chelator and 58%-92.75% of water. This mixture is allowed to remain in the well for about 10-14 hours so that any left residue is removed from the well, and the formation face adjacent the liner 16 is cleaned of potential production inhibitors.

The mixture of the mineral acid is removed from the well by the circulation of a foam flow with the added iron chelator, similarly to the method of disposal of hydrochloric acid utilized before.

This concluding step insures substantially complete cleanout of the well and restoration of the producing rate of the particular well.

As was indicated above, it is important to maintain a regulated pressure during any foaming process. In the case of a well stimulation, this pressure may range from 250-1500 lbs. High foam pressures are relatively rare but may be employed in deep high pressure wells. However, certain foam velocity in the foam circulation process should be maintained so that there is no possibility of a foam plugging in the annulus 22. After such well treatment has been completed, a normal production can be resumed and the production tubing 18 can again serve to circulate hydrocarbons from the well.

Many changes and modifications in the above described embodiment of the invention can of course be carried out without departing from the scope thereof. Accordingly, that scope is intended to be limited only by the scope of the appended claims.

I claim:

1. A method of treating a hydrocarbon producing well utilizing foam injection, comprising the steps of:
  circulating the foam up the well to remove substantially all fluids and loose solids from the well;
  dissolving substantially all liquid and solid hydrocarbons left in the well at a formation level;
  circulating a mixture of foam and mineral acid up the well to remove ferrous salts and calcium carbonate;
  removing calcium sulfate from the well by injecting a calcium sulfate converter to cover the face of the well at the formation level;
  removing the converted calcium sulfate by a flow of foam which comprises a mixture of 0.5-2% of solvent, 0.25-2% of corrosion inhibitor and 96-99.25% of water; and
  circulating a mixture of foam, mineral acid and iron chelator up the well to remove substantially all residue left in the well.

2. A method of improving recovery of hydrocarbons from a hydrocarbon-bearing formation utilizing foam injection, comprising the steps of:
  circulating the foam up the well to remove substantially all loose solids and fluids from the well;
  injecting a mutual solvent to dissolve substantially all of liquid and solid hydrocarbons left in the well at a formation level;
  circulating foam up the well to remove the dissolved hydrocarbons;
  circulating a mixture of foam and a mineral acid up the well to remove iron sulfate, iron oxide and calcium carbonate from the well;
  circulating a mixture of foam and iron chelator up the well;
  injecting a calcium sulfate converter to substantially cover formation face of the well;
  removing the converted calcium sulfate by circulating it up the well in the presence of a foam flow as a fluid carrier;
  injecting a mineral acid in the presence of acid inhibitor and iron chelator down the well bore; and
  circulating the foam with an iron chelator up the well to substantially remove all residue left in the well.

3. The method of claim 1, wherein the mineral acid is a hydrochloric acid.

4. The method of claim 1, wherein the ferrous salts comprise a salt from a group consisting of iron sulfate and iron oxide.

5. The method of claim 1, wherein the step of dissolving substantially all liquid and solid hydrocarbons left in the well at the formation level comprises a step of injecting a mutual solvent into the well.

6. The method of claim 1, further comprising the step of removing the dissolved hydrocarbons from the well in the presence of a foam flow as a fluid carrier, prior to circulating a mixture of foam and mineral acid up the well to remove ferrous salts and calcium carbonate.

7. The method of claim 6, wherein the mixture of foam and mineral acid utilized for removal of ferrous salts and calcium carbonate comprises a hydrochloric acid as the mineral acid, and wherein the mixture comprises 1.5–3% of a foaming agent, 5–30% of hydrochloric acid and 67–93.5% of water.

8. The method of claim 1, wherein the mixture of foam and iron chelator utilized for removal of the substantially all residue left in the well comprises 5–30% of hydrochloric acid, 0.25–2% of corrosion inhibitor, 2–10% of iron chelator and 58–92.75% of water.

* * * * *